United States Patent
Wood et al.

(10) Patent No.: US 8,472,361 B2
(45) Date of Patent: Jun. 25, 2013

(54) METHOD OF GENERATING REPEATED DATA PACKAGE TRANSMISSION

(75) Inventors: Peter Wood, Ely (GB); Steven Wenham, Burwell (GB)

(73) Assignee: Cambridge Silicon Radio Limited, Cambridge (GB)

(*) Notice: Subject to any disclaimer, the term of this patent is extended or adjusted under 35 U.S.C. 154(b) by 383 days.

(21) Appl. No.: 12/828,332

(22) Filed: Jul. 1, 2010

(65) Prior Publication Data

US 2011/0019599 A1    Jan. 27, 2011

(30) Foreign Application Priority Data

Jul. 27, 2009    (GB) .................................. 0913018.8

(51) Int. Cl.
*G08C 17/00*    (2006.01)
(52) U.S. Cl.
USPC ............................ 370/311; 370/328; 714/748
(58) Field of Classification Search
None
See application file for complete search history.

(56) References Cited

U.S. PATENT DOCUMENTS

| 7,577,111 | B2* | 8/2009 | Yeung et al. | 370/310 |
|---|---|---|---|---|
| 8,238,835 | B2* | 8/2012 | Nagai et al. | 455/67.11 |
| 8,255,754 | B2* | 8/2012 | Tsfati et al. | 714/748 |
| 2004/0198223 | A1* | 10/2004 | Loh et al. | 455/41.1 |
| 2007/0297440 | A1* | 12/2007 | Moon | 370/458 |
| 2009/0143012 | A1* | 6/2009 | Jeon | 455/41.2 |
| 2010/0075603 | A1 | 3/2010 | Newton et al. | |
| 2010/0302102 | A1* | 12/2010 | Desai et al. | 342/417 |
| 2010/0309869 | A1* | 12/2010 | Kim et al. | 370/329 |
| 2011/0302014 | A1* | 12/2011 | Proctor et al. | 705/14.23 |

\* cited by examiner

*Primary Examiner* — Michael J Moore, Jr.
(74) *Attorney, Agent, or Firm* — Pillsbury Winthrop Shaw Pittman LLP

(57) ABSTRACT

Repeated data packets are generated from a first Bluetooth enabled device to a second Bluetooth enabled device to facilitate radio direction finding of the first device by the second device. A communication connection is established between the first and second devices in accordance with a Bluetooth protocol stack and in response to receiving at the second device a data packet transmitted by the first device the second device transmits an NACK data packet to the first device, whereby the first device is cause to retransmit said data packet, and causing the second device to process at least one of the transmitted data packet and the retransmitted data packet in accordance with a radio direction finding algorithm. The communication connection preferably comprises a remote name request.

12 Claims, 2 Drawing Sheets

-- Prior art --

-- Prior art --

METHOD OF GENERATING REPEATED DATA PACKAGE TRANSMISSION

FIELD OF THE INVENTION

The present application relates to a method of generating a repeated stream of data packets to facilitate radio direction finding.

BACKGROUND TO THE INVENTION

Radio direction finding is a method of determining from received radio signals the direction in which the radio transmitter lies. A common method of performing radio direction finding is to configure an array of antennas to receive the signals and determine the direction of the transmitter using the differences in phase and amplitude in the signals received at each antenna in the array. As mobile telephones, as well as other mobile devices, move towards becoming ubiquitous devices there is a desire to provide radio direction finding capability within such devices. It is already very common for such mobile devices to include a wireless radio transceiver, for example, a WiFi transceiver or Bluetooth transceiver, which allows relatively short-range data communication to occur between similarly enabled devices. Consequently, there is a desire to use the existing radio transceivers, such as Bluetooth, to perform radio direction finding using such mobile devices. However, it is expensive in terms of cost and physical space to provide a mobile device having a plurality of radio antennas to perform the radio direction finding method mentioned above.

To overcome this problem the present applicants have already developed a method of radio direction finding that makes use of the particular characteristic of the data packets transmitted using the Bluetooth transmission protocol. In this method, described in the applicants co-pending UK patent application No. 0816688.6 (and counterpart U.S. Patent Application Publication No. 2010/0075603), use is made of the fact that within each header packet of a Bluetooth transmission each data symbol is transmitted as three repeated bits. This allows the radio signal received at two separate antennas within a single mobile device to be sampled by switching between the two separate antennas within the time period over which the three bits are transmitted. This allows phase variations between different samples to be eliminated such that relative phase data for the different antennas can be derived, which can then be subsequently used to perform conventional radio direction finding algorithms.

However, whilst the method described in UK patent application No. 0816688.6 allows radio direction finding to be performed using a single data packet, from a user operability and quality of user experience point of view it is more desirable for the radio direction finding process to be performed on a stream of data packets to allow a pseudo real time direction feedback to be provided to a user. Additionally, in the method described in UK patent application No. 0816688.6, and also in other radio direction finding techniques, actual data content of the received packet is lost, or at best rendered unverifiable. To ensure that existing wireless devices that do not have dedicated radio direction finding capabilities incorporated within them are nonetheless locatable using radio direction finding techniques it is more desirable to be able to perform the radio direction technique by using any data packets transmitted during the normal operation of such devices and without interfering with the transmission of those packets to such an extent that information being conveyed by those packets is lost.

SUMMARY OF THE INVENTION

According to an aspect of the present invention there is provided a method of generating repeated data packets from a first Bluetooth enabled device to a second Bluetooth enabled device to facilitate radio direction finding of the first device by the second device, the method comprising establishing a communication connection between the first and second devices in accordance with a Bluetooth protocol stack, in response to receiving at the second device a data packet transmitted by the first device, causing the second device to transmit an NACK data packet to the first device, whereby the first device is caused to retransmit said data packet, and causing the second device to process at least one of the transmitted data packet and the retransmitted data packet in accordance with a radio direction finding algorithm.

The step of transmitting the NACK data packet is preferably repeated.

Additionally or alternatively the communication connection may comprise an ACL connection. The communication connection may use one or more layers of the protocol stack above the host controller interface or alternatively may not use any layer of the protocol stack above the link manager. In the latter alternative the communication connection may comprise a Remote Name Request, which does not involve layers above the link manager.

According to a second aspect of the present invention there is provided a computer program product comprising executable instructions that when executed by a Bluetooth enabled data processing device caused said device to implement the method of the first aspect.

According to a third aspect of the present invention there is provided a Bluetooth enabled device arranged to perform radio direction finding, the device being arranged to implement the method of the first aspect.

BRIEF DESCRIPTION OF THE DRAWINGS

Embodiments of the present invention are described below, by way of illustrative example only, with reference to the accompanying figures, of which.

DESCRIPTION OF EMBODIMENTS OF THE INVENTION

United Kingdom patent application No. 0816688.6 describes a system and method for performing a radio direction finding using Bluetooth enabled devices in which a Bluetooth enabled device has at least two antennas switchably connected to a single receive chain. When that device receives a data packet from a second Bluetooth enabled device, the location of which it is desired to be determined, the receive chain is arranged to switch between the first and second antennas within the same symbol transmission period. This is done to utilise the ⅓ forward error correction (FEC) properties of Bluetooth data transmissions in which each data symbol is represented by three bits having the same bit value. Using the methodology described in UK patent application No. 0816688.6 the relative phase of the received signal at the multiple antennas can be determined and subsequently used to perform radio direction finding techniques to provide an output indicating the direction of the device to be found from the initial device performing a radio direction finding. However, although this technique does allow radio direction finding to be formed between Bluetooth enabled devices, the actual content of the data packet received by the seeking device and on which the radio direction finding technique is performed is lost, or at the very best rendered unverifiable. This is because the Bluetooth data packets have a CRC (Cyclic Redundancy Check) checksum calculated across them to verify their correct reception and the act of switching between the separate antennas at the receiving device is highly likely to destroy some of the data bits received, thus rendering the CRC invalid. This poses a potential problem in performing successful direction findings where multiple Bluetooth enabled devices are present.

Figure 1:
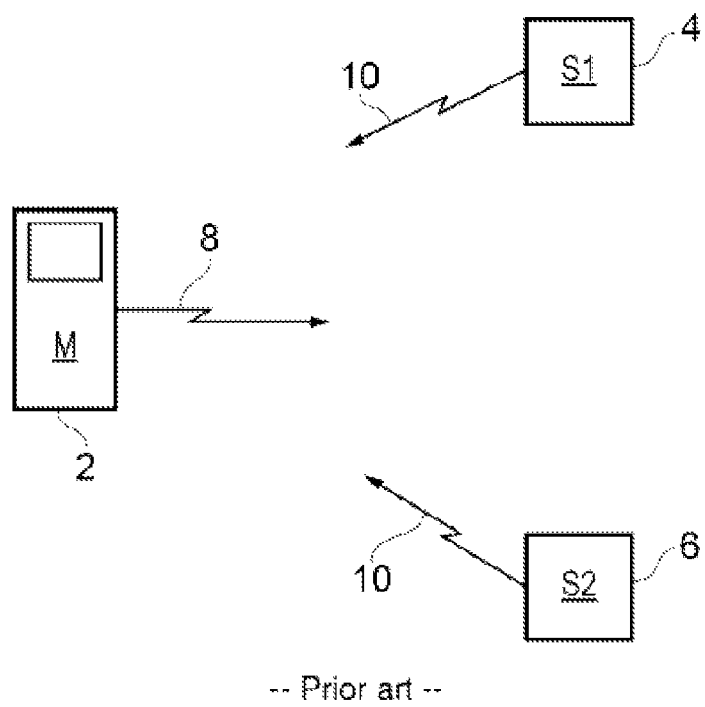
FIG. 1 schematically illustrates a typical device discovery scenario involving multiple Bluetooth devices.

FIG. 1 schematically illustrates a possible scenario in which multiple Bluetooth enabled devices are present. In the scenario illustrated in FIG. 1 a master device 2 and two further slave devices 4, 6 are present. It is desired to use the master device 2 to perform radio direction finding on one of the slave devices 4, 6. The master device 2 may be any suitably equipped Bluetooth enabled device, such as a mobile phone or PDA. The slave devices 4, 6 may also be mobile phones or PDAs or any other Bluetooth enabled device, such as a headset, computer, or some other object to which a Bluetooth enabled tag has been fixed. Assuming that no connection already exists between the master device 2 and either of the slave devices 4, 6, and assuming that both slave devices are set to be discoverable, then for the master device 2 to illicit any response from either of the slave devices the master device must transmit a device inquiry ordinarily used to determine the presence, and subsequently the identity, of any Bluetooth enabled devices within range of the master device. Any Bluetooth enabled device receiving the inquiry packets transmitted from the master device will respond by in turn transmitting inquiry response packets. If only one slave device was present then it would be possible for the master device 2 to retrieve the required direction finding information from the inquiry response packet 10 transmitted by the single slave device. However, in the situation illustrated in FIG. 1 where more than one slave device is present, each slave device will respond to the inquiry packets transmitted by the master device and since the direction finding method is likely to destroy the content of the received inquiry response packets it will not be possible for the master device to determine which slave device the packets were receive from. Furthermore, it is desirable to perform the direction finding on a stream of received data packets to allow a continuous and updated indication of the direction of the device being sought to be presented on the master device to the user. Where multiple slave devices are present it would not be possible to determine whether or not the same slave device was responding to the multiple inquiry requests sent by the master device. Consequently, a regular stream of packets, which a master device could use to ascertain direction of a target slave device, cannot be reliably generated using inquiry techniques.

This difficulty can be overcome according to a first embodiment of the present invention in which a formal connection between a master and slave device is made. As referred to above, in normal operation when two Bluetooth devices are connected, when a first device receives a data packet with a correct CRC it returns an acknowledgement (ACK) to the original sending device. When that ACK has been successfully received by the original sending device then the next data packet may be transmitted. However, the transmission protocol also dictates that if the receiving device sends a NACK back to the transmitting device, as would ordinarily occur if the received packet does not have a correct CRC, then the transmitting device must resend the same data packet. The Bluetooth protocol dictates that this must continue until either the receiving device receives the data packet correctly and sends a subsequent ACK, or until a supervisory timeout dictates that the devices either move on to the next data packet or totally cease their efforts to communicate. The requirement of the Bluetooth protocol for a device to retransmit the same data packet if it receives a NACK in response to a previous transmission of that data packet is utilised in a first embodiment of the present invention.

Figure 2:
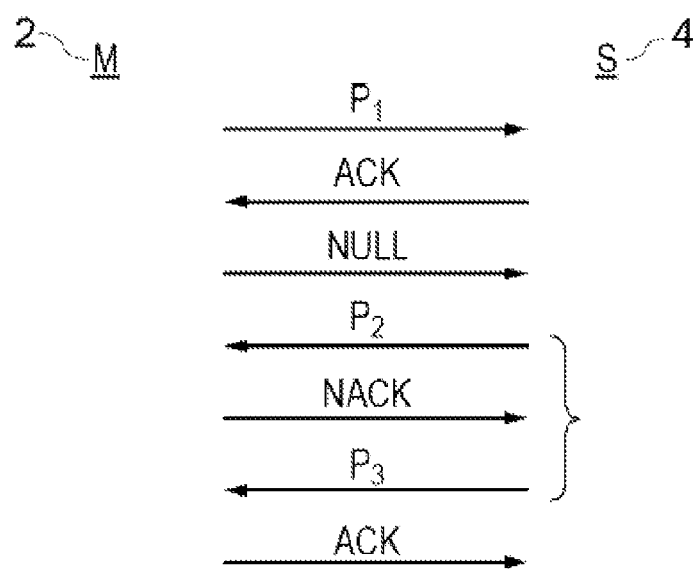
FIG. 2 diagrammatically represents the data packet transmission between two Bluetooth devices in accordance with an embodiment of the present invention.

Referring to FIG. 2, a possible sequence of data packet transmissions between a master device performing direction finding on a target slave device is schematically illustrated. In FIG. 2 a first data packet P1 is transmitted from the master device 2 to the slave device 4. This data packet may be part of a normal communication between the master and slave devices and is acknowledged by the slave device by the transmission of an ACK packet from the slave device to the master device. To progress the communication the master device may then transmit a NULL packet, receipt of which by the slave device does not require an ACK packet to be sent. Instead, the slave device may return a full data packet P2 to the master device, which may constitute a reply to the original data packet P1 transmitted by the master device. If it is now desired for direction finding to be performed by the master device with regards to the slave device then the master device responds to receipt of the data packet P2 from the slave device by transmitting a NACK packet to the slave device, irrespective of whether or not the CRC checksum of the received data packet P2 is valid or not. In accordance with the Bluetooth protocol the slave device responds to receipt of the NACK from the master device by retransmitting the same data packet P2 again. The master device may retransmit further NACK packets as required to cause a stream of data packets to be sent from the target slave device. The repetition of sending a NACK packet in response to receiving a data packet from the targets slave device constitutes an embodiment of the present invention. The repetition of NACKing the received data packet P2 by the seeking master device and subsequent retransmission of P2 by the target slave device, as indicated by the bracketed sequences in FIG. 2, may continue until either the direction finding is completed and the master device transmits an ACK data packet to the target slave device or a supervisory time out of the communication is triggered.

Figure 3:
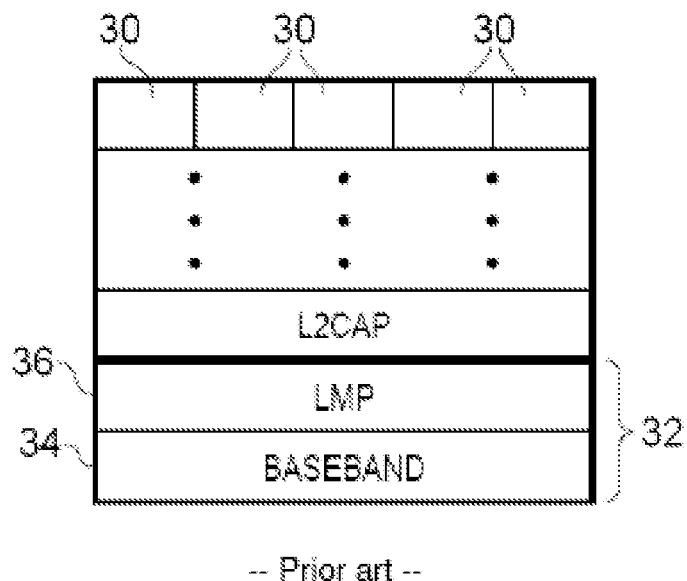
FIG. 3 is a simplified diagrammatic representation of the Bluetooth stack.

However, there are certain disadvantages in causing the repeated data packets to be sent by a target slave device for direction finding in this manner. FIG. 3 shows a simplified diagrammatic representation of the Bluetooth protocol stack. The protocol stack specifies the protocols that must be followed by third parties when manufacturing and developing both software and hardware to communicate with each other using Bluetooth. Whilst different devices or applications may use different protocol stacks at a device or application level, they will all use a common physical layer 32, which in the simplified diagram shown in FIG. 3 comprises the base band layer 34 and a link management protocol (LMP) 36. The base band and LMP protocols are managed by the Bluetooth implementation on the controller device and as such do not require the use of any of the host device services. The first protocol layer above the physical layer is the logical link control and adaptation protocol (L2CAP) and this is the first protocol layer that requires host device services. Consequently, the interface between the physical layer 32 and the L2 CAP layer is generally referred to as the host controller interface (HCI).

Normally, for a master device to establish a connection to a slave device, such as during the direction finding method according to the first implementation of the present invention described above, the host on the slave device is required to explicitly accept the connection, more specifically it must accept the asynchronous connection link (ACL). When the ACL connection is accepted, L2CAP connections are then established to access the upper protocol layer services, thus requiring the use of the slave device services and hardware. At the very least, this leads to an increase in power consumption of the slave device, since at least some of the slave device services and hardware is required to be powered up and in operation. At worst, the connection will be dropped by the slave device almost immediately, since many devices, and in particular older, legacy devices, will not tolerate an open and unused ACL connection as such connections are presumed by the upper layers of the Bluetooth protocol on the slave device to be a security violation and will often therefore be dropped after short time-outs (i.e. an ACL link is open but no traffic comes down it). This will be the case where the master device only wants to perform radio direction finding, since there the master device will have no actual data to transmit to the slave device. The repeated NACK technique of the embodiment of the present invention described above can therefore lead to the connection being dropped by the slave device before any significant direction finding can be performed by the communicating master device.

Figure 4:
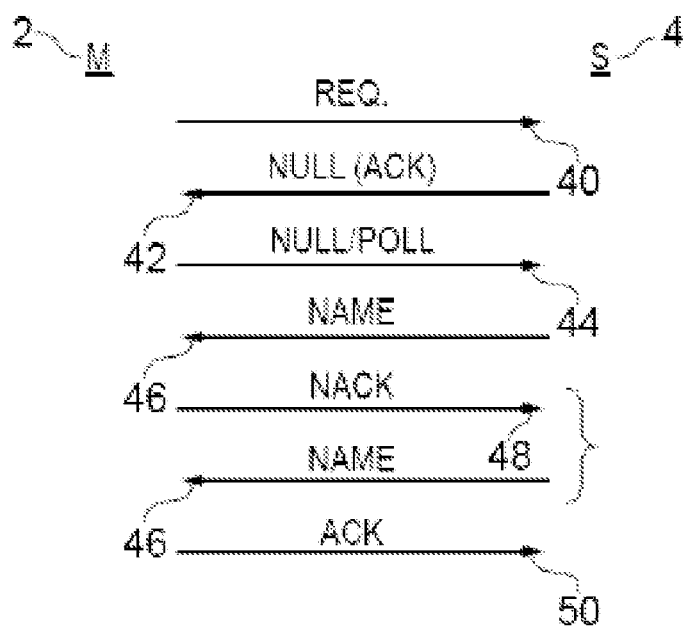
FIG. 4 is a diagrammatic representation of a data packet transmission between two Bluetooth devices in accordance with a second embodiment of the present invention.

A further embodiment of the present invention seeks to at least partially address the disadvantages referred to immediately above. As previously mentioned, a master Bluetooth device can ascertain if there are any other Bluetooth devices (slave devices) within range by performing an inquiry request. Any slave devices receiving the inquiry request initially return an inquiry response that includes a 48-bit Bluetooth address (BD_ADDR) that is unique to that slave device. On receiving the inquiry response, the master Bluetooth device may then use the received Bluetooth address to establish a baseband connection that does not involve any layers above the Link Manager and transmit a remote name request that will only be responded to by the slave device to which it is addressed. The purpose of the remote name request is to ascertain the friendly name of the slave Bluetooth device to display to the user of the master device in subsequent procedures. The remote name request is handled at the base band and link manager protocol layers, i.e. the physical layer, only. However, a baseband link is also established, which as previously discussed requires the specific acknowledgement of received data packets between the two communicating Bluetooth devices. FIG. 4 diagrammatically illustrates the possible sequence of data packet communications between a master and slave device during a remote name request and to which the second embodiment of the present invention is applied to obtain a continuous stream of data packets. The sequence of packet transmissions between a master device 2 and a slave device 4, which have previously performed an inquiry scan and response, are diagrammatically illustrated in FIG. 4 in descending order. The master device initially sends a remote name request 40 addressed to the previously identified slave device on which direction finding is to be accomplished. This is responded to by the slave device with a NULL (ACK) packet 42 acknowledging receipt of the remote name request. The master device then responds with a further NULL packet 44 which may be either a NULL or a POLL packet. The slave device then continues the communication by sending its friendly name 46 as requested. At this point the procedure according to the second embodiment of the present invention occurs in the form of the master device sending a NACK 48 packet back to the slave device, regardless of whether or not the name packet was received correctly or not. As demanded by the communication protocol, having received the NACK packet the slave device responds by again sending the same name packet 46. This procedure, indicated by the curled bracket on FIG. 4, continues for as long as it is desired to perform the direction finding methods. The communication is finally completed by the master device sending an acknowledgement packet 50 to the slave device.

This procedure is advantageous in comparison with the first embodiment of the present invention because although the remote name request procedure does involve establishing an ACL link between the master and slave devices, it does not involve any of the protocol layers higher than the link manager (LMP). This means that crucially the host on the slave device above the host controller interface is not informed of the connection and therefore the host, if in standby mode, need not be awoken and significant power savings can be made. Furthermore, because the remote name request constitutes a valid ACL connection and even the repeated NACK and name packets constitute a valid data traffic, the ACL link is not automatically dropped.

The remote name request is only one example of a standard communication exchange that only requires the physical layers of the devices to be active and none of the host services to be aware of the communication. Any of these other well known LMP communications may equally be used with the above described second embodiment to the present invention.

A possible alternative method of overcoming the limitations described above in performing radio direction finding on Bluetooth devices is to provide a master (seeking) device having a dual receive chain in which one of the receive chains receives incoming data packets (either inquiry or packets in the connection state) and decodes them as usual, whilst the second receive chain performs the previously discussed antenna switching process on the received packets to perform the radio direction finding. However this dual receive chain approach is significantly more expensive in terms of hardware and power consumption. It is also possible to simply repeat the inquiry or remote name request procedures without causing individual packets to be repeatedly transmitted and to perform the radio direction finding techniques on the received packets as previously discussed, however, repeating the entire inquiry or remote name request process is also wasteful in terms of power consumption, together with the time delay that will occur between subsequent inquiry/name request transmissions introduces a significant degree of latency into the radio direction finding scheme such that the output of the radio direction finding algorithms cannot be completely relied upon.

The invention claimed is:

1. A method of generating repeated data packets from a first Bluetooth enabled device to a second Bluetooth enabled device to facilitate radio direction finding of the first device by the second device, the method comprising:

establishing a communication connection between the first and second devices in accordance with a Bluetooth protocol stack;

in response to receiving at the second device a data packet transmitted by the first device, causing the second device to transmit an NACK data packet to the first device, whereby the first device is caused to retransmit said data packet; and causing the second device to process at least one of the transmitted data packet and the retransmitted data packet in accordance with a radio direction finding algorithm, wherein the communication connection does not use any layer of the protocol stack above the host controller interface.

2. The method of claim 1, wherein the step of transmitting the NACK data packet is repeated.

3. The method of claim 1, wherein the communication connection comprises a baseband connection.

4. The method of claim 1, wherein the communication connection comprises a Remote Name Request.

5. A non-transitory computer program product for facilitating radio direction finding of a first Bluetooth enabled device by a second Bluetooth device, the non-transitory computer program product comprising executable instructions stored thereon that when executed by the second Bluetooth enabled devices cause said device to:

establish a communication connection between the first and second devices in accordance with a Bluetooth protocol stack;

in response to receiving at the second device a data packet transmitted by the first device, cause the second device to transmit an NACK data packet to the first device, whereby the first device is caused to retransmit said data packet; and cause the second device to process at least one of the transmitted data packet and the retransmitted data packet in accordance with a radio direction finding algorithm, wherein the communication connection does not use any layer of the protocol stack above the host controller interface.

6. The computer program product of claim 5, wherein the step of transmitting the NACK data packet is repeated.

7. The computer program product of claim 5 wherein the communication connection comprises a baseband connection.

8. The computer program product of claim 5, wherein the communication connection comprises a Remote Name Request.

9. A first Bluetooth enabled device to arranged to perform radio direction finding of a second Bluetooth enabled device, the first device being arranged to:

establish a communication connection with the second device in accordance with a Bluetooth protocol stack;

in response to receiving a data packet transmitted by the second device, transmitting an NACK data packet to the second device, whereby the second device is caused to retransmit said data packet; and processing at least one of the transmitted data packet and the retransmitted data packet in accordance with a radio direction finding algorithm, wherein the communication connection does not use any layer of the protocol stack above the host controller interface.

10. The device of claim 9, wherein the step of transmitting the NACK data packet is repeated.

11. The device of claim 9, wherein the communication connection comprises a baseband connection.

12. The device of claim 9, wherein the communication connection comprises a Remote Name Request.

* * * * *